United States Patent
Kaasenbrood

[15] 3,697,519
[45] Oct. 10, 1972

[54] PROCESS FOR SEPARATING OFF MELAMINE FROM A HOT SYNTHESIS GAS MIXTURE WHICH CONTAINS MELAMINE VAPOR

[72] Inventor: Petrus J. C. Kaasenbrood, Sittard, Netherlands

[73] Assignee: Stamicarbon N.V., Heerlen, Netherlands

[22] Filed: Dec. 9, 1970

[21] Appl. No.: 96,466

Related U.S. Application Data

[63] Continuation-in-part of Ser. No. 837,479, June 30, 1969.

[30] Foreign Application Priority Data

Dec. 11, 1969 Netherlands..............6918571

[52] U.S. Cl......................260/249.7 P, 260/249.7 A
[51] Int. Cl..............................................C07d 55/24

[58] Field of Search..................260/249.7 A, 249.7 P

[56] References Cited

UNITED STATES PATENTS

| 3,239,522 | 3/1966 | Cook et al. | 260/249.7 |
| 3,544,628 | 12/1970 | Hsu | 260/249.7 |
| 3,578,664 | 5/1971 | Kaasenbrood | 260/249.7 |

*Primary Examiner*—John M. Ford
*Attorney*—Cushman, Darby & Cushman

[57] ABSTRACT

A process relating to the separation of melamine from hot synthesis gas mixtures is described, wherein such gases are contacted directly with a urea melt containing ammonium carbamate, so that the desublimation heat released as the melamine is converted from the vapor to the solid state is utilized for the decomposition of the ammonium carbamate to release ammonia and carbon dioxide.

6 Claims, 1 Drawing Figure

PATENTED OCT 10 1972
3,697,519
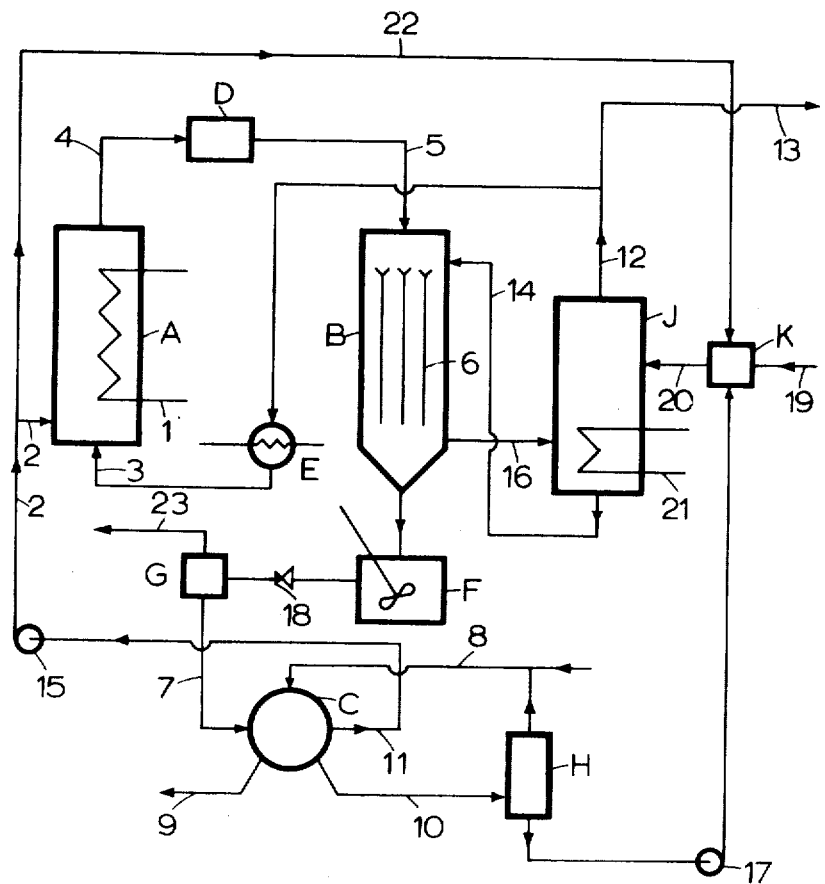
INVENTOR
PETRUS J.C. KAASENBROOD
BY Cushman, Darby & Cushman
ATTORNEYS

PROCESS FOR SEPARATING OFF MELAMINE FROM A HOT SYNTHESIS GAS MIXTURE WHICH CONTAINS MELAMINE VAPOR

This application is a continuation-in-part of applicant's co-pending application Ser. No. 837,479 filed June 30, 1969, the disclosure of which is incorporated herein by reference.

The invention relates to a process for separating off melamine from a hot synthesis gas mixture which contains melamine vapor. Such a gas mixture is obtained in the preparation of melamine starting from urea, wherein urea is converted by heating, possibly under pressure, into a gas mixture containing melamine, ammonia, and carbon dioxide. The reaction proceeds according to the equation:

$$6 CO(NH_2)_2 \rightarrow C_3N_6H_6 + 6 NH_3 + 3 CO_2$$

As the reaction is in most cases carried out in the presence of a catalyst and with a gas stream which contains ammonia, the synthesis gas will generally contain more ammonia than appears, stoichiometrically, from the above-mentioned reaction equation.

Cooling of the resulting hot reaction gases then makes it possible for the melamine to be separated off as solid matter from the remaining gases by desublimation. Consequently, a suitable cooling technique is required.

It has been proposed to effect the cooling of the reaction gases which contain the melamine vapor by directly contacting the hot gases with a gaseous, liquid or solid coolant.

However, the use of a gaseous coolant involves the drawback of requiring the recycle of large quantities of gas, whereas the heat removed becomes largely available at so low a temperature level that its utilization is not pertinent.

As liquid coolants, water and inert liquids, such as high-boiling hydrocarbons, have also been proposed.

However, use of an inert, high-boiling liquid requires that the desublimated melamine to be recovered from the liquid, as by filtration, and steps must be taken to remove any adhering, inert liquid from the solid melamine by means of special solvents.

Further, use of water or a dilute aqueous solution of, for instance, ammonium carbonate as coolant, means that the gases, now freed from melamine, will contain much water vapor.

As a result of this water content such gases are not suitable, as such, for recirculation to the melamine synthesis reactor, while this water is also objectionable when the gases, which contain ammonia and carbon dioxide are intended to be used in other processes, e.g., for the preparation of urea.

As solid coolant, a whirling bed of melamine particles has also been proposed. Such a cooling method requires, however, considerable plant investment, in that a relatively large whirling bed has to be maintained. Moreover, from a technical point of view there is no simple solution to the problem of keeping the heat-discharging surface, on which the desublimating melamine will deposit, in a clean condition.

Applicant has already proposed to separate off the melamine from the hot synthesis gases by contacting the hot gases with melted urea with simultaneous discharge on the one hand, of melamine suspended in the urea melt, and, on the other, of the gases which are virtually freed from melamine.

The heat liberated during the desublimation of melamine, together with the sensible heat of the gas stream which contains the melamine vapor, are thus transferred via the urea melt to cooling water, flowing through cooling elements present in the urea melt, during which procedure useful steam can be produced.

However, this method for separating off the melamine still involves the drawback that melamine crystals are deposited on the heat-exchanging surfaces of the cooling elements, so that the cooling efficiency thereof can be retained, only if said surfaces are frequently cleaned of the melamine layer formed thereon.

The present invention relates to a process which eliminates the drawbacks inherent to the separating methods discussed above.

The present invention relates in particular to a process in which melamine vapors present in a gas mixture, are desublimated and in which the liberated heat is removed without use of heat-exchanging surfaces on which the melamine crystals might deposit.

According to the present invention melamine is separated off from the hot synthesis gases by contacting said hot gases with a urea melt which contains ammonium carbamate, with simultaneous discharge, on the one hand, of a suspension of melamine in an ammonium carbamate-impoverished urea melt, and, on the other hand, of a virtually melamine-free gas stream, which gas mixture principally contains $NH_3$ and $CO_2$.

The heat liberated during this separating process is removed by decomposition of ammonium carbamate according to the endothermic reaction:

$$NH_2COONH_4 \rightarrow 2 NH_3 + CO_2 - Q \text{ kcal}$$

The ammonia and carbon dioxide thus formed are discharged from the desublimation zone along with the melamine-freed gas mixture, which is itself also a mixture of ammonia and carbon dioxide.

The composition of the urea-ammonium carbamate melt, with which the melamine-containing synthesis gas mixture is contacted, may vary within wide limits, depending on pressure and temperature conditions.

For instance, at a pressure of 8 atm. abs. and at 100° C., or at 20 atm. abs. and 105° C., the melt may contain 35 percent by weight of dissolved ammonium carbamate.

The process according to the present invention does require that all the ammonium carbamate be dissolved. The melamine-containing synthesis gases may also be contacted with a suspension of ammonium carbamate in a melt which contains urea and ammonium carbamate. However, such a suspension should have a proper flow in the desublimation zone; and, as a result of this, the content of solid ammonium carbamate should, preferably, be kept below about 30 percent by weight when a suspension is employed.

Although desublimation of melamine vapor by contacting the same with an ammonium carbamate-containing urea melt at atmospheric conditions is possible, it is more attractive to operate at a pressure of, for instance, 5–10 atm. abs. The size of the equipment, as well as the required quantity of urea melt, can be then reduced, because at elevated pressure the melt is capable of containing appreciably more ammonium carbamate than at atmospheric pressure.

Preferably, according to the process of the invention, urea melts with a total ammonium carbamate content of 15–40 percent by weight are employed wherein this ammonium carbamate may be either completely dissolved or, be partly present in suspension.

On economic grounds, relating to compression costs, it is more advantageous if the suspension of melamine crystals in an ammonium carbamate-impoverished melt of urea and ammonium carbamate, which suspension is to be discharged from the sublimation zone, contains the least possible quantity of ammonium carbamate. This derives from the circumstance, that, ultimately, this remaining ammonium carbamate is recovered in the form of gaseous ammonia and carbon dioxide at only atmospheric pressure.

Theoretically, therefore, it is the most advantageous if the suspension to be discharged from the desublimation zone should no longer contain ammonium carbamate. In actual practice it will be difficult to fully realize this goal, but it can indeed be achieved (making allowance for the fact that 2.5 kg of ammonium carbamate are required per kg of melamine to be desublimated) by choosing the proper ratio between the quantity of melamine to be desublimated per unit of time and the quantity of ammonium carbamate to be supplied along with the melt, and by seeing that the ammonium carbamate content of the melamine suspension ultimately to be discharged from the desublimation zone amounts to less than 10 percent by weight of ammonium carbamate (based on the free melt, free from solid melamine).

In view of side-reactions it is also of importance that the temperatures in the desublimation zone do not increase excessively. Therefore, the ratio between the ammonium carbamate to be decomposed and the urea in the desublimation zone will preferably be set so that the temperature of the melamine suspension to be discharged will lie between 120° and 180° C., preferably between 140° and 160° C.

The melamine suspension should have good flowing properties so as to remain dischargeable by a pump. Therefore, the viscosity of this suspension should not be allowed to become too high on account of too high a content of solid particles. Thus, the suspension composition should be controlled so as not to contain more than about 50% by weight of melamine.

On the other hand, from the viewpoint of the economies of the subsequent separation step(s), the amount of suspended melamine should not be allowed to fall to unnecessarily low levels either. Economic separation is possible at concentrations above about 5 percent by weight of melamine.

The melamine particles may be separated off from the melt in known manners, such as filtration or centrifuging. If necessary, the separation may be preceded by concentration of the suspension, e.g., by means of a cyclone or a sieve bend.

The melamine particles obtained after the separation, which are still impure due to adhering urea melt, can then be freed from such urea impurities by simple washing with water.

The amount of dilute urea solution thus produced may, in the usual ways, such as concentration to a melt or concentration and crystallization, be brought to a condition in which this urea can be re-used, either at the melamine synthesis stages or for the preparation of the aforesaid melt containing urea and ammonium carbamate.

The heat liberated during the desublimation of melamine is, in the desublimation zone, partly used for raising the temperature of the urea melt feed and partly for the decomposition of the ammonium carbamate component present in the melt.

The heat utilized for this decomposition is present in latent form in the $NH_3$ and $CO_2$-containing gas mixture which is discharged from the desublimation zone. This heat becomes available again by reforming of ammonium carbamate from $NH_3$ and $CO_2$, e.g., by absorption of the gases in melted urea. Via cooling surfaces in the absorber apparatus this heat can then be transferred, for instance to a solution which is to be concentrated or to be heated.

With the aid of a compressor the off-gases may also be compressed to a high pressure, e.g., 125 atm. or even higher, and be used for the formation of ammonium carbamate by condensation at a high pressure, in which the heat evolving at a high temperature level, for instance 160° C. or higher, can be utilized for the formation of steam. Part of the ammonium carbamate melt formed may be discharged to a urea synthesis reaction stage and the balance may be mixed with urea to obtain the required urea and ammonium carbamate-containing melt which is necessary for separating off the melamine from the hot melamine synthesis gases.

The process according to the invention will now be elucidated on the basis of the attached drawing which is a diagrammatic survey of the process and the typical required apparatus.

According to this figure, melamine synthesis reactor A, filled with catalyst particles which are kept at the required temperature by heating coil 1, is supplied via line 2 with melted urea and via line 3 with a fluidizing gas, such as a gas mixture which contains ammonia and carbon dioxide.

The synthesis gases, at a temperature of 380° C., are discharged from the reactor via line 4. They are purified from catalyst dust in filtering device D and, subsequently, led via line 5 to desublimator B wherein the gases are contacted with a melt composed of urea and ammonium carbamate and which is continuously supplied to desublimator B via line 14.

In desublimator B the melt is distributed over vertically arranged plates 6 along which it descends as a film, in parallel flow with the melamine-containing gases. During this procedure the gases are cooled and in the bottom part of desublimator B a suspension of melamine crystals in an ammonium carbamate-impoverished urea melt accumulates.

The resultant melamine suspension in the urea melt is led, via buffer tank F, relieve valve 18, separating vessel G and line 7, to centrifuge C, which receives wash water via line 8. Melamine crystals, cleaned by this washing, leave the system via line 9, and the urea solution obtained at the washing step is sent through line 10 to evaporator H, where the urea solution is concentrated into a melt.

The water quantity thus evaporated in H can be utilized as wash water for centrifuge C. The minor amount of gas separated off in separating vessel G is discharged via line 23.

The melamine-freed urea melt obtained in C is discharged to the melamine synthesis reactor A via line 11, pump 15 and line 2.

The melamine-freed gases obtained in vessel B are introduced through line 16 into condensor J, where the gases are contacted with a urea melt supplied by mixing vessel K via line 20. Part of the gases condenses into ammonium carbamate; the heat of this condensation thereby liberated is discharged through a tubular cooling system 21.

Gases which have not condensed in condensor J are for the greater part recycled to melamine synthesis reactor A via line 12 and heater E. Further, the gases from the synthesis can be precooled by mixing part of these relatively cold gases from condensor J with the hot gases from the synthesis.

A quantity of gas corresponding to the quantity of gas formed during the production of melamine is discharged through line 13; this gas may, for instance, be led to a urea synthesis, which is not shown in the drawing.

The molten urea supply to this melamine synthesis system is fed to the mixing vessel K of the system through line 19, i.e., in such a quantity per time unit as corresponds to the desired amount of urea to be supplied to synthesis reactor A via line 2.

Further, a quantity of urea melt from evaporator H is fed to mixing vessel K via pump 17, while, moreover, in view of the temperature control in desublimator B, an amount of melted urea is kept in circulation by means of line 22, mixing vessel K, line 20, condensor J, line 14, desublimator B, buffer tank F, valve 18, separating vessel G, line 7, centrifuge C, line 11, pump 15 and line 2.

The desublimation according to the invention may be carried out both at atmospheric pressure and at superatmospheric pressure. The choice of pressure will, among other factors, be dependent on the pressure conditions utilized for the synthesis of melamine.

In addition to ammonium carbamate, the circulating urea will likely contain a minor quantity of other products resulting from the decomposition of urea, such as biuret. This forms no objection at all, since the melt will have a lower crystallization point due to this circumstance, which factor is especially of importance in condensor J, as the risk of solid components depositing on the cooling coils will thereby be less.

The decrease of the melting point of urea melt amounts to approximately 1° C. per 1 percent of biuret present; in practice, a biuret content of 1-5 percent by weight will be preferred.

According to the drawing, a quantity of gas mixture consisting of $NH_3$ and $CO_2$ is recycled to the reactor through line 3. It is also possible, however, to operate reactor A on fresh $NH_3$ and avoiding recycling said gas mixture or to feed the reactor not only with the recirculation gas, but also with fresh $NH_3$.

EXAMPLE

Melamine synthesis reactor A, operating at 390° C. and 8 atm., is fed with 1,000 kg of urea melt of 160° C. per hour. As fluidization gas 1830 m³ N.T.P. of a gas mixture, consisting of 2 parts by volume of $NH_3$ and 1 part by volume of $CO_2$, are used.

In the presence of a suitable catalyst, e.g., silica gel, and upon supply of the correct quantity of heat, the melamine efficiency, referred to the urea introduced, amounts to 95 percent.

The composition of the reaction gases is as follows:
417 kg of melamine
36 kg of HNCO
1,270 kg of $NH_3$
1,500 kg of $CO_2$.

These reaction gases are contacted in sublimator B with 2,619 kg of urea melt of 100° C., containing 35 percent by weight of ammonium carbamate; the melamine suspension obtained, which has a temperature of 150° C., is discharged to buffer tank F, where the crystals have the opportunity to grow at the expense of the very small crystals.

Next, the melamine suspension is expanded, towards separating vessel G, up to atmospheric pressure, during which gaseous $NH_3 + CO_2$ escape via line 23, in a quantity of 11 kg. The remaining suspension is centrifuged, and 330 kg of melamine are recovered.

At the same time, by washing out the melamine crystals, 680 kg of urea solution with a concentration of 46 percent by weight are produced, which are concentrated into a melt in evaporator H and recycled via pump 17.

The gas stream which escapes from sublimator B, and which consists of:
1,529 kg of $NH_3$
1,980 kg of $CO_2$ is, for 26 percent, made to condense into ammonium carbamate in condensor J. while 57 percent is recycled to melamine synthesis reactor A and the balance, e.g., discharged to a urea plant.

What is claimed is:

1. In processes for separating solid melamine from hot synthesis gas mixtures containing melamine vapors wherein the hot gas mixture from the melamine synthesis stage is cooled by direct contact with a liquid urea melt to a melamine suspension in the said melt, and wherein the solid melamine is thereafter separated from said melt, the improvement consisting essentially in utilizing as said urea melt a liquid mixture of urea and ammonium carbamate wherein at least such a quantity of ammonium carbamate is present that the heat released during the desublimation of said melamine vapors as well as the sensible heat released from the hot synthesis gas mixture during said contacting are principally utilized in the contacting system for endothermic decomposition of said ammonium carbamate component of said melt to form ammonia and carbon dioxide.

2. A process according to claim 1, wherein said melt contains from about 15 percent to about 40 percent by weight of ammonium carbamate, and up to about 5 percent by weight of biuret.

3. A process according to claim 1, wherein said suspension of melamine formed in said melt contains from about 5 percent to about 50 percent by weight of melamine crystals.

4. A process according to claim 1, wherein the ammonia and carbon dioxide obtained by said decomposition of ammonium carbamate are, in whole or in part, subsequently condensed into ammonium carbamate with discharge of heat energy.

5. A process according to claim 4, wherein said ammonium carbamate formed by said subsequent decomposition is reused, together with urea, for the cooling of said melamine-containing synthesis gas mixture.

6. A process according to claim 1, wherein after said decomposition and separation of solid melamine, the urea melt left is at least in part cycled as feed stock to the melamine synthesis stage.

* * * * *